United States Patent
Nedwed et al.

(10) Patent No.: US 10,246,983 B2
(45) Date of Patent: Apr. 2, 2019

(54) SYSTEMS AND METHODS FOR ACHIEVING THREE-PHASE SEPARATION AND CORE ANNULAR FLOW IN PIPELINES

(71) Applicants: Timothy J. Nedwed, Houston, TX (US); Xiaolei Yin, Conroe, TX (US)

(72) Inventors: Timothy J. Nedwed, Houston, TX (US); Xiaolei Yin, Conroe, TX (US)

(73) Assignee: ExxonMobil Upstream Research, Spring, TX (US)

( * ) Notice: Subject to any disclaimer, the term of this patent is extended or adjusted under 35 U.S.C. 154(b) by 0 days.

(21) Appl. No.: 15/615,129

(22) Filed: Jun. 6, 2017

(65) Prior Publication Data

US 2018/0030823 A1    Feb. 1, 2018

Related U.S. Application Data

(60) Provisional application No. 62/367,964, filed on Jul. 28, 2016.

(51) Int. Cl.
*E21B 43/36* (2006.01)
*F22B 37/32* (2006.01)
(Continued)

(52) U.S. Cl.
CPC .............. *E21B 43/36* (2013.01); *E21B 43/01* (2013.01); *F16T 1/00* (2013.01); *F17D 1/08* (2013.01);
(Continued)

(58) Field of Classification Search
CPC .. E21B 43/34; E21B 43/36; E21B 2043/0115; F17D 1/082; F22B 37/32
See application file for complete search history.

(56) References Cited

U.S. PATENT DOCUMENTS 759,374 A     5/1904  Isaacs et al.
2,941,619 A * 6/1960  Sochor .................. B01D 45/16
                                                       96/208
(Continued)

FOREIGN PATENT DOCUMENTS

EP    1352679         10/2003
WO    2009/006672      1/2009
WO    2010/070281      6/2010

OTHER PUBLICATIONS

Peysson, Y. et al. (Nov. 1-3, 2005), "Pipeline Lubrication of Heavy Oil: Experimental Investigation of Flow and Restart Problems," 2005 SPE Int'l. Thermal Operations and Heavy Oil Symposium, Calgary, CA, 6 pgs.

(Continued)

*Primary Examiner* — James G Sayre
(74) *Attorney, Agent, or Firm* — ExxonMobil Upstream Research Company—Law Department (57) ABSTRACT

A method for the subsea transport of a multi-phase production fluid from a wellhead to a point remote from the wellhead, the multi-phase production fluid comprising a water phase, an oil phase and a gas phase. The method includes introducing the multi-phase production fluid into a pipeline, the pipeline extending from proximate the wellhead to a point remote from the wellhead; imparting rotational motion to the multi-phase production fluid; wherein the rotational motion of the multi-phase production fluid separates the water phase from the oil phase and the gas phase and reduces the pressure drop along the pipeline. A system for the subsea transport of a multi-phase production fluid from a wellhead to a point remote from the wellhead and a method for reducing hydrate formation during the (Continued)

subsea transport of a multi-phase production fluid from a wellhead to a point remote from the wellhead are also provided.

20 Claims, 6 Drawing Sheets

(51) Int. Cl.
  *F17D 1/08* (2006.01)
  *E21B 43/01* (2006.01)
  *F16T 1/00* (2006.01)
  *F17D 3/10* (2006.01)
  *F17D 3/14* (2006.01)

(52) U.S. Cl.
  CPC ............... *F17D 3/10* (2013.01); *F17D 3/14* (2013.01); *F22B 37/32* (2013.01)

(56) References Cited

U.S. PATENT DOCUMENTS

| | | | | |
|---|---|---|---|---|
| 7,703,535 | B2* | 4/2010 | Benson | ............... E21B 17/01 141/82 |
| 2005/0006086 | A1* | 1/2005 | Gramme | ............ B01D 17/0208 166/105.5 |
| 2008/0257436 | A1* | 10/2008 | Caro | ..................... B01F 5/0646 137/808 |
| 2009/0301729 | A1 | 12/2009 | Makogon et al. | |
| 2011/0127029 | A1* | 6/2011 | Ganelin | .................. E21B 17/01 166/86.2 |
| 2017/0129783 | A1* | 5/2017 | Kim | ........................ E21B 43/01 |
| 2017/0321520 | A1* | 11/2017 | Berchane | ............... E21B 36/008 |

OTHER PUBLICATIONS

Peigne, G. et al., "Improving the Pumping of Viscous Oil by the Use of Demulsifiers or by an Annular Water Injection," 1989 Oil Spill Conf., American Petroleum Institute, Washington, DC, pp. 175-180.

Cooper, D.W. et al. (2001), "Assisted Pumping of Extremely Viscous Oils," Proceedings of the Twenty-Fourth Arctic and Marine Oilspill Program Technical Seminar, Environment Canada, Ottawa, Ontario, p. 373-386.

Loesh, R.M et al. (2001), "Pumping emulsified crude oil and viscous oils using annular water injection and steam coils," Proceedings of the Twenty-Fourth Arctic and Marine Oilspill Program Technical Seminar, Environment Canada, Ottawa, Ontario, pp. 319-338.

Cooper, D. et al. (2002), "Heavy Oil Pumping—A Method to the Madness?," Proceedings of the Twenty-Fifth Arctic and Marine Oilspill Program Technical Seminar, Environment Canada, Ottawa, Ontario, pp. 127-137.

* cited by examiner

SYSTEMS AND METHODS FOR ACHIEVING THREE-PHASE SEPARATION AND CORE ANNULAR FLOW IN PIPELINES

CROSS-REFERENCE TO RELATED APPLICATION

This application claims the benefit of U.S. Provisional Patent Application Ser. No. 62/367,964, filed Jul. 28, 2016, entitled SYSTEMS AND METHODS FOR ACHIEVING THREE-PHASE SEPARATION AND CORE ANNULAR FLOW IN PIPELINES, the entirety of which is incorporated by reference herein.

FIELD

The present disclosure relates to the subsea transport of a multi-phase production fluid and to systems and methods for same.

BACKGROUND

In subsea hydrocarbon production systems, production fluids may be transported via pipeline back to a topsides production facility. Multi-phase flow in deep-water pipelines can present significant challenges with respect to flow assurance and pressure loss. For transporting production fluids in long subsea pipelines, which can be more than 100 km long, flow assurance issues related to hydrate and wax production caused by multi-phase flow and temperature/pressure conditions, may necessitate separating the gas, oil, and water at or very near the well location, and transferring each phase through a separate pipeline. Alternatively or additionally, pipeline heating and insulation schemes, and/or chemical treatment methods may be employed. These solutions can be expensive, complex, and prone to maintenance challenges.

Therefore, there is an on-going desire to develop a technology that mitigates or eliminates these challenges in a cost effective way.

SUMMARY

In one aspect, disclosed herein is a system for the subsea transport of a multi-phase production fluid from a wellhead to a point remote from the wellhead, the multi-phase production fluid comprising a water phase, an oil phase and a gas phase. The system includes a pipeline extending from proximate the wellhead to a point remote from the wellhead, the pipeline structured and arranged to impart rotational motion to the multi-phase production fluid and effective to separate the water phase from the oil phase and the gas phase and reduce the pressure drop along the pipeline.

In some embodiments, the rotational motion imparted is effective to reduce hydrate formation. In some embodiments, the rotational motion imparted is effective to reduce settling out of precipitated waxes and solids, including produced sand.

In some embodiments, the system further includes a plurality of pumping stations positioned along the pipeline to provide additional pressure to maintain flow and phase separation.

In some embodiments, the system further includes one or more helical grooves formed along an internal surface of the pipeline to impart rotational motion to the multi-phase production fluid. In some embodiments, the one or more helical grooves are continuous along the length of the pipeline.

In some embodiments, the system further includes one or more helical strakes or ribs formed along an internal surface of the pipeline to impart rotational motion to the multi-phase production fluid. In some embodiments, the one or more helical strakes or ribs are continuous along the length of the pipeline.

In some embodiments, the system further includes a water inlet tangentially positioned to the flow of the multi-phase production fluid to impart rotational motion.

In some embodiments, the system further includes a separation station for separately removing each phase of the multi-phase production fluid proximate a processing facility.

In some embodiments, the system further includes a detector to monitor produced water, the produced water comprising water and dissolved gas; and an injector to inject additional water into the pipeline if the produced water is below a predetermined level. In some embodiments, the additional water is injected proximate the wellhead. In some embodiments, the additional water injected reduces the concentration of dissolved gas below a saturation concentration.

In another aspect, disclosed herein is a method for the subsea transport of a multi-phase production fluid from a wellhead to a point remote from the wellhead, the multi-phase production fluid comprising a water phase, an oil phase and a gas phase. The method includes introducing the multi-phase production fluid into a pipeline, the pipeline extending from proximate the wellhead to a point remote from the wellhead; and imparting rotational motion to the multi-phase production fluid; wherein the rotational motion of the multi-phase production fluid separates the water phase from the oil phase and the gas phase and reduces the pressure drop along the pipeline.

In some embodiments, the method further includes periodically pumping along the pipeline to provide additional pressure to maintain flow and phase separation.

In some embodiments, the method further includes monitoring produced water; and if the produced water is below a predetermined level, injecting additional water into the pipeline.

In some embodiments, the method further includes injecting additional water into the pipeline to reduce the concentrations of dissolved gases below their saturation concentration thereby reducing the potential for hydrate formation.

In some embodiments, the method further includes providing one or more pumps along the length of the pipeline to provide additional pressure within the pipeline to maintain flow and phase separation.

In some embodiments, the method further includes separately removing each phase of the multi-phase production fluid proximate a processing facility.

In yet another aspect, disclosed herein is a method for reducing hydrate formation during the subsea transport of a multi-phase production fluid from a wellhead to a point remote from the wellhead. The method includes introducing the multi-phase production fluid into a pipeline, the pipeline extending from proximate the wellhead to a point remote from the wellhead; and imparting rotational motion to the multi-phase production fluid; wherein the rotational motion of the multi-phase production fluid separates the water phase from the oil phase and the gas phase, reduces the pressure drop along the pipeline, and reduced hydrate formation.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. A given embodiment illustrated in a figure is not required to include all structures and/or features that are illustrated in solid lines therein, and any suitable number of such structures and/or features may be omitted from a given embodiment without departing from the scope of the present disclosure.

It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which.

DETAILED DESCRIPTION

Terminology

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

And/or: The term "and/or" placed between a first entity and a second entity means one of: (1) the first entity; (2) the second entity; and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation may be combined with one or more other embodiments and/or implementations of the present disclosure. Thus, the appearance of the phrases "in one embodiment" or "in an embodiment" or "in some embodiments" (or "aspects" or "implementations") in various places throughout the specification are not necessarily all referring to the same embodiment and/or implementation. The particular features, structures, methods, or characteristics of one embodiment may be combined in any suitable manner with features, structures, methods, or characteristics of one or more other embodiments or implementations.

Exemplary: "Exemplary" is used exclusively herein to mean serving as an example, instance, or illustration. Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, and may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in series, it is to be appreciated that in some examples various actions could occur concurrently, substantially in parallel, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Operatively connected, attached, and/or coupled: Operatively connected, attached and/or coupled means directly or indirectly connected features or elements in such a way to perform a designated function.

Order of method steps: It should also be understood that, unless clearly indicated to the contrary, in any methods described herein that include more than one step or act, the order of the steps or acts of the method is not necessarily limited to the order in which the steps or acts of the method are recited.

Proximate: The term "proximate" is used herein to mean a feature or element that is positioned at or near another feature or element.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of 1 to 200 should be interpreted to include not only the explicitly recited limits of 1 and 200, but also to include individual values such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Description

FIGS. 1-6 provide illustrative, non-exclusive examples of assemblies, systems and methods for the subsea transport of a multi-phase production fluid from a wellhead to a point remote from the wellhead, according to the present disclosure, together with elements that may include, be associated with, be operatively attached to, and/or utilize such assemblies, systems and methods.

Although the approach disclosed herein can be applied to a variety of designs and operations, the present description will primarily be directed to systems and methods for the subsea transport of a multi-phase production fluid.

In FIGS. 1-6, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure. A given embodiment is not required to include all the structures and/or features that are illustrated in solid lines therein, and any suitable number of such structures and/or features may be omitted from a given embodiment without departing from the scope of the present disclosure.

Figure 1:
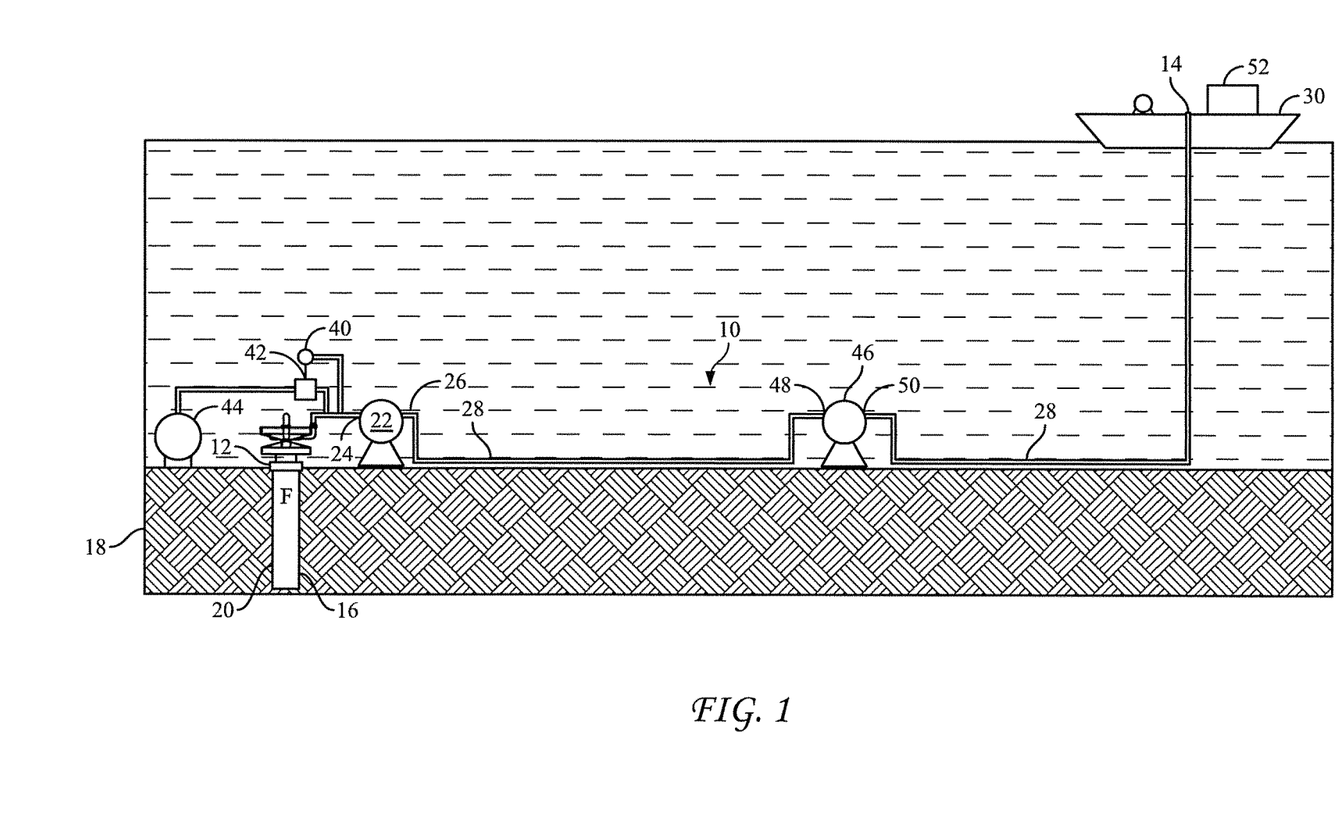
FIG. 1 illustrates a schematic view of an illustrative, nonexclusive example of a system for the subsea transport of a multi-phase production fluid from a wellhead to a point remote from the wellhead, according to the present disclosure.

FIG. 1 presents, for illustrative purposes, a schematic view of an illustrative, nonexclusive example of a system 10 for the subsea transport of a multi-phase production fluid from a wellhead 12 to a point remote from the wellhead 14, according to the present disclosure. As shown, wellhead 12 is in fluid communication with a wellbore 16, which extends into a subsurface formation 18, the subsurface formation having a production zone (not shown). Wellbore 16 may be provided with a casing 20.

In some embodiments, system 10 includes a pump 22 having an inlet 24 and a discharge 26. As shown, the pump 22 may be structured and arranged so as to be in fluid communication with the wellbore 16. A source of produced multi-phase production fluid F is in fluid communication with the inlet 24 of the pump 22. The discharge 26 of the pump 22 is in fluid communication with a pipeline 28 and introduces multi-phase production fluid F into the pipeline 28. The pipeline 28 is also in fluid communication with the point remote from the wellhead 14.

In some embodiments, the pump 22 may be a multi-phase pump for boosting the pressure of the multi-phase production fluid F. As those skilled in the art will appreciate, a multi-phase pump may be designed to handle the complete production flow from a well (oil, natural gas, water and sand) without the need to separate or process the production stream proximate the wellhead. Suitable multi-phase pumps are available from Schlumberger Technology Corporation, Houston, Tex., Sulzer Pumps (US) Inc., Brookshire, Tex., and other suppliers and may include twin-screw pumps, piston pumps and helicoaxial pumps.

In some embodiments, the point remote from the wellhead 14 may be a surface production vessel 30. In some embodiments, the point remote from the wellhead 14 may be a surface platform (not shown), onshore facility (not shown) or a subsea storage facility (not shown).

Figure 2:
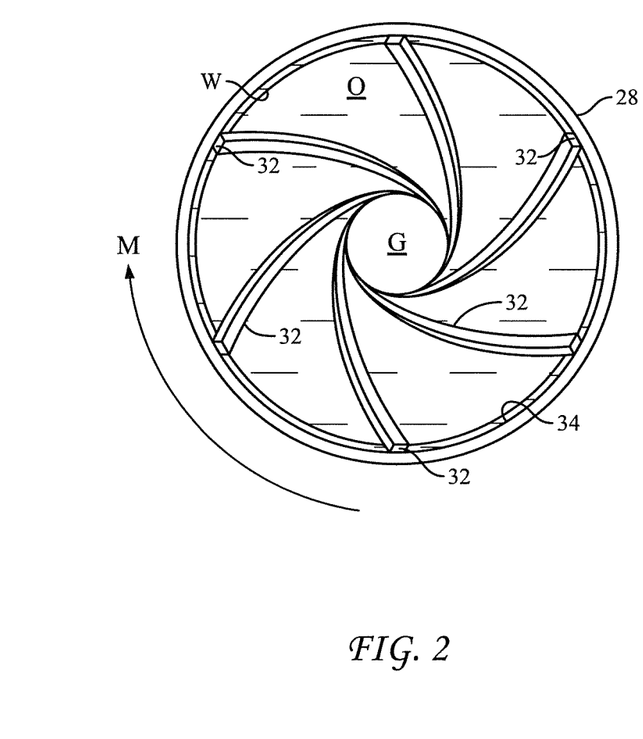
FIG. 2 illustrates a cross-sectional schematic view of an illustrative, nonexclusive example of a pipeline for the subsea transport of a multi-phase production fluid, according to the present disclosure.

FIG. 2 is a cross-sectional schematic view of an illustrative, nonexclusive example of a pipeline 28 for the subsea transport of a multi-phase production fluid, according to the present disclosure. As shown in FIG. 1, pipeline 28 may extend from proximate the wellhead 12 to a point remote from the wellhead 14. Referring to FIG. 2, the pipeline 28 is structured and arranged to impart rotational motion M to the multi-phase production fluid and is effective to separate the water phase W from the oil phase O and the gas phase G, as shown, and reduce the pressure drop along the pipeline 28.

As shown in FIG. 2, the pipeline 28 includes one or more helical strakes or ribs 32 formed along an internal surface 34 of the pipeline 28 to impart rotational motion M to the multi-phase production fluid. The rotational motion M may be clockwise or counterclockwise. In some embodiments, the one or more helical strakes or ribs 32 are positioned along a length of the pipeline 28 proximate the wellhead but after the discharge of any multi-phase pump positioned proximate the wellhead and optionally after the discharge of any additional multi-phase pumps associated with transporting the multi-phase production fluid through the pipeline 28, such as along a length proximate the wellhead 12 after the discharge 26 of the pump 22 and along a length after the discharge 50 of the pump 46. In some embodiments, the one or more helical strakes or ribs 32 are continuous along substantially the entire length of the pipeline 28 (for example, along at least 90% of the length of the pipeline or along at least 95% of the length of the pipeline or along at least 98% of the length of the pipeline).

In some embodiments, as a result of separating the gas G from the water W, the rotational motion imparted M is effective to reduce hydrate formation within pipeline 28, even in harsh subsea environments.

In some embodiments, as a result of creating an effective level of turbulence, the rotational motion M imparted may be effective to reduce the settling out of precipitated waxes and solids, including produced sand, within pipeline 28, even in harsh subsea environments. Also, since waxes that may be present should be less dense than water, the waxes may remain suspended in the oil phase or at the interface between the oil phase O and the water phase W, which will keep them from settling onto the internal surface 34 of the pipeline 28.

Figure 3:
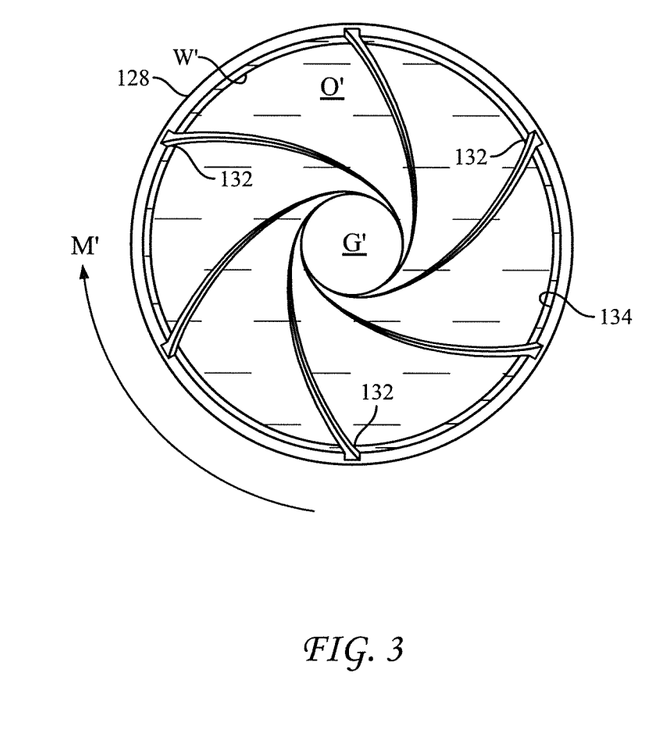
FIG. 3 illustrates a second cross-sectional schematic view of an illustrative, nonexclusive example of a pipeline for the subsea transport of a multi-phase production fluid, according to the present disclosure.

FIG. 3 is a cross-sectional schematic view of another illustrative, nonexclusive example of a pipeline 128 for the subsea transport of a multi-phase production fluid, according to the present disclosure. Similar to FIG. 1, pipeline 128 may extend from proximate the wellhead to a point remote from the wellhead. The pipeline 128 is structured and arranged to impart rotational motion M' to the multi-phase production fluid and is effective to separate the water phase W' from the oil phase O' and the gas phase G', as shown, and reduce the pressure drop along the pipeline 128.

As shown, the pipeline 128 includes one or more helical grooves 132 formed along a length of an internal surface 134 of the pipeline 128 to impart rotational motion M' to the multi-phase production fluid. The rotational motion M' may be clockwise or counterclockwise. In some embodiments, the one or more helical grooves 132 are positioned along a length of pipeline 128 proximate the wellhead but after the discharge of any multi-phase pump positioned proximate the wellhead and optionally after the discharge of any additional multi-phase pumps associated with transporting the multi-phase production fluid through the pipeline 128. In some embodiments, the one or more helical grooves 132 are continuous along substantially the entire length of the pipeline 128 (for example, along at least 90% of the length of the pipeline or along at least 95% of the length of the pipeline or along at least 98% of the length of the pipeline).

In some embodiments, as a result of separating the gas G' from the water W', the rotational motion imparted M' is effective to reduce hydrate formation within pipeline 128, even in harsh subsea environments.

In some embodiments, as a result of creating an effective level of turbulence, the rotational motion M' imparted may be effective to reduce the settling out of precipitated waxes and solids, including produced sand, within pipeline 128, even in harsh subsea environments.

Figure 4:
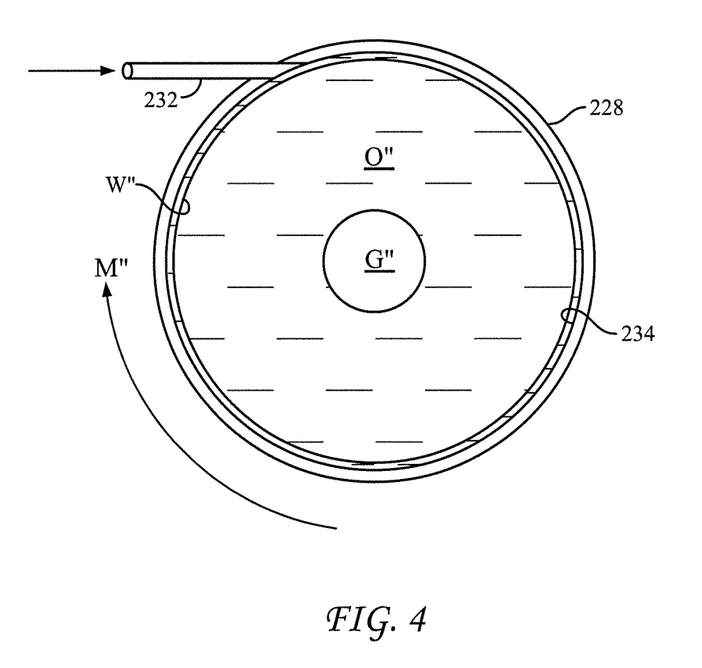
FIG. 4 illustrates a third cross-sectional schematic view of an illustrative, nonexclusive example of a pipeline for the subsea transport of a multi-phase production fluid, according to the present disclosure.

FIG. 4 is a cross-sectional schematic view of yet another illustrative, nonexclusive example of a pipeline 228 for the subsea transport of a multi-phase production fluid, according to the present disclosure. Similar to FIG. 1, pipeline 228 may extend from proximate the wellhead to a point remote from the wellhead. The pipeline 228 is structured and arranged to impart rotational motion M" to the multi-phase production fluid and is effective to separate the water phase W" from the oil phase O" and the gas phase G", as shown, and reduce the pressure drop along the pipeline 228.

As shown, the pipeline 228 includes one or more water inlets 232, tangentially positioned to the flow of the multi-phase production fluid to impart rotational motion M" to the multi-phase production fluid. The rotational motion M" may be clockwise or counterclockwise. In some embodiments, a water inlet 232 is tangentially positioned proximate the wellhead but after the discharge of any multi-phase pump positioned proximate the wellhead and optionally after the discharge of any additional multi-phase pumps associated with transporting the multi-phase production fluid through the pipeline 228.

In some embodiments, the pipeline may be structured and arranged to impart rotational motion to the multi-phase production fluid and be effective to separate the water phase from the oil phase and the gas phase using a combination of elements such as a combination of helical strakes or ribs 32 and helical grooves 132; helical strakes or ribs 32 and water inlets 232; helical grooves 132 and water inlets 232; or helical strakes or ribs 32, helical grooves 132, and water inlets 232.

In some embodiments, as a result of separating the gas G" from the water W", the rotational motion imparted M" is effective to reduce hydrate formation within pipeline 228, even in harsh subsea environments. In some embodiments, as a result of creating an effective level of turbulence, the rotational motion M" imparted is effective to reduce the settling out of precipitated waxes and solids, including produced sand, within pipeline 128, even in harsh subsea environments.

The systems and methods disclosed herein utilize core-annular flow (CAF) to reduce the pressure drop typically associated with the transfer of more viscous fluids. CAF utilizes a thin annulus of water W, W', W" between the internal surface 34, 134, 234 of the pipeline 28, 128, 228 and the oil O, O', O" in the core. The annulus of water W, W', W" acts to lubricate the flow of the oil O, O', O". A property of CAF is that the pressure drop in the pipeline 28, 128, 228 is nearly that of water alone, and only weakly or minimally dependent on the viscosity of the oil O, O', O".

Heretofore, CAF has had limited application in the transport of production fluids due to long-distance stability concerns and the high pressures associated with restart after shut in. The stability issue arises because over longer distances, the water tends to interact with the oil and emulsify. In addition, gravity separation may cause the oil to eventually float on top of the water and begin impinging on the top of the pipe to increase friction.

An issue also arises in emergency shutdowns, particularly when transporting viscous oils. During an emergency shut in, the viscous oil and water will sit and separate. Once this happens, the advantage of CAF is lost and clearing the pipe of the viscous oil and re-establishing CAF requires extreme pumping pressures to the point that it can be impractical.

The systems and methods disclosed herein address these issues by utilizing centrifugal force to separate multi-phase immiscible fluids by forcing the fluids to rotate within a static pipeline. As described with reference to FIGS. 2 and 3, this may be accomplished by constructing the pipeline with internal strakes or ribs 32, grooves 132, or some other structure for inducing rotation of the produced multi-phase fluids.

The centrifugal force from the rotation will cause the water to transfer to the inner surface of the pipeline. Once the water annulus forms, it will behave in the manner of traditional CAF to reduce the pressure drop in the pipeline. In summary, the systems and methods disclosed herein serve to generate centrifugal forces by rotating the fluids in the pipeline to separate the fluids; the resulting core annular flow reduces the pressure drop in the pipeline.

In some embodiments, the internal strakes or ribs 32, grooves 132, or other structure for inducing rotation of the produced multi-phase fluids may be formed over the entire length of the pipeline. In some embodiments, the internal strakes or ribs 32, grooves 132, or other structure for inducing rotation of the produced multi-phase fluids may be formed over a portion or portions of the pipeline, as desired, to separate the immiscible fluids. The speed of the fluid rotation is determined by the amount of induced rotation and the rate of flow. Faster rotation will cause greater centrifugal force and slower rotation less.

As may be appreciated by those skilled in the art, hydrocyclones typically require very fast rotation to develop large centrifugal forces to facilitate the rapid separation of fluids. This is because the residence time in the vessel is short. The systems and methods disclosed herein do not require rapid rotation or large centrifugal forces because the residence time of the fluids within the pipeline will be much longer. This allows the separation to occur over long periods.

For oil fields with formation water, the produced water will be the annular lubricant. If the amount of formation water is not sufficient to achieve a consistent CAF, a system to add annular water flow at the start of the pipeline may be provided. Referring to FIG. 1, in some embodiments the system 10 may include a detector 40 to monitor produced water; and an injector 42 to inject water from a source of water 44 into the pipeline 28, if the produced water is below a predetermined level. In some embodiments, the injector 42 injects additional water proximate the wellhead 12. In some embodiments, the injector 42 injects additional water between the wellhead 12 and the inlet 24 of the pump 22.

In some embodiments, the injector 42 injects additional water to bring the dissolved gas concentration below its saturation concentration. As may be appreciated, hydrate formation may be reduced or completely eliminated if the dissolved gas concentration is reduced below its saturation concentration.

Rotation of the fluids can expend system energy. As such, the input of additional energy may be desirable. Accordingly, in some embodiments, the system 10 may include one or more additional pumps 46 placed at appropriate locations along the pipeline 28 to provide additional pressure to substantially maintain flow and phase separation across the length of pipeline 28. As shown, each additional pump 46 includes an inlet 48 and a discharge 50, placed in fluid communication with pipeline 28. In some embodiments, the system 10 may include one or more additional multi-phase pumps placed at appropriate locations along the pipeline 28 to provide additional pressure.

Once the separated fluids reach a processing facility, a method of transferring the gas, oil, and water to separate flow lines may be provided. One possibility is to send the flow as one stream to the surface processing facility. The benefit of immiscible fluid separation to reduce surface processing requirements, however, can be limited.

Another possibility is to separate the immiscible fluids at the end of the pipeline 28, 128, 228 before they reach the processing facility. In some embodiments, separation methods similar to those used for hydrocyclones may be employed. As may be appreciated by those skilled in the relevant art, any other suitable method to recover separate phases within the pipeline may be employed. In some embodiments, the system 10 includes a separation station 52 for separately removing each phase of the multi-phase production fluid. FIG. 1 illustrates the separation station 52 on the surface production vessel 30. In other embodiments, the system may include a separation system separate from the surface production vessel or a processing facility and located proximate such vessel or facility.

In some embodiments, system 10 may include a sand control structure (not shown), which may be structured and arranged to limit the flow of sand into inlet 24 of pump 22.

Figure 5:
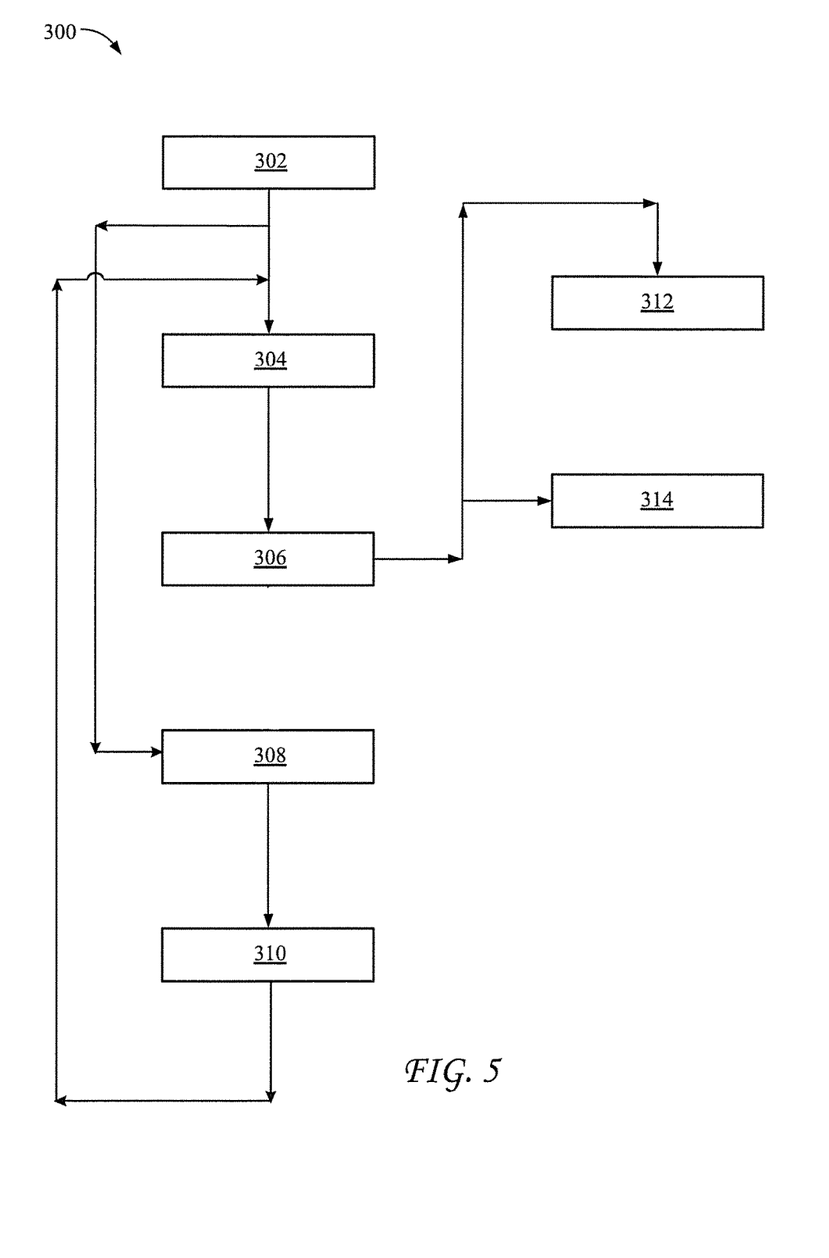
FIG. 5 illustrates a flow diagram of an exemplary method for the subsea transport of a multi-phase production fluid from a wellhead to a point remote from the wellhead, according to the present disclosure.

Referring now to FIG. 5, a method 300 for the subsea transport of a multi-phase production fluid from a wellhead to a point remote from the wellhead, according to the present disclosure, is presented. As disclosed herein, the multi-phase production fluid includes a water phase, an oil phase and a gas phase. The method includes, at block 302, introducing the multi-phase production fluid into a pipeline, the pipeline extending from proximate the wellhead to a point remote from the wellhead. At block 304, rotational motion (clockwise or counterclockwise) is imparted to the multi-phase production fluid; then, at block 306, the water phase is separated from the oil phase and the gas phase and the pressure drop reduced along the pipeline. In some embodiments, the water phase may be substantially separated from both the oil phase and the gas phase and the oil phase may be substantially separated from both the water phase and the gas phase such that the gas phase forms the radially innermost region within the interior of the pipeline, the water phase forms the radially outermost region within the interior of the pipeline, and the oil phase forms the region within the interior of the pipeline between the gas phase and the water phase.

In some embodiments, the method 300 further includes at block 308, monitoring produced water. If the produced water is below a predetermined level, additional water is injected into the pipeline at block 310. In some embodiments, the additional water is injected proximate the wellhead.

In some embodiments, the method 300 further includes at block 312, providing one or more pumps along the length of the pipeline to periodically provide additional pressure within the pipeline to maintain flow and phase separation.

In some embodiments, the method 300 further includes at block 314, separately removing each phase of the multi-phase production fluid proximate a processing facility.

In some embodiments, the rotational motion imparted at block 304 is effective to reduce hydrate formation. In some embodiments, the rotational motion imparted at block 304 is effective to reduce settling out of precipitated waxes and solids, including produced sand.

In some embodiments, the rotational motion imparted at block 304 is imparted by one or more helical grooves formed within a length of an internal surface of the pipeline. In some embodiments, the one or more helical grooves are positioned along a length of pipeline proximate the wellhead but after the discharge of any multi-phase pump positioned proximate the wellhead and optionally after the discharge of any additional multi-phase pumps associated with transporting the multi-phase production fluid through the pipeline. In some embodiments, the one or more helical grooves are continuous along substantially the entire length of the pipeline.

In some embodiments, the rotational motion imparted at block 304 is imparted by one or more helical strakes or ribs formed along a length of an internal surface of the pipeline. In some embodiments, the one or more helical strakes or ribs are positioned along a length of the pipeline proximate the wellhead but after the discharge of any multi-phase pump positioned proximate the wellhead and optionally after the discharge of any additional multi-phase pumps associated with transporting the multi-phase production fluid through the pipeline. In some embodiments, the one or more helical strakes or ribs are continuous along substantially the entire length of the pipeline.

In some embodiments, the rotational motion imparted at block 304 is imparted by one or more water inlets tangentially positioned to the flow of the multi-phase production fluid. In some embodiments, a water inlet is tangentially positioned proximate the wellhead but after the discharge of any multi-phase pump positioned proximate the wellhead and optionally after the discharge of any additional multi-phase pumps associated with transporting the multi-phase production fluid through the pipeline.

Figure 6:
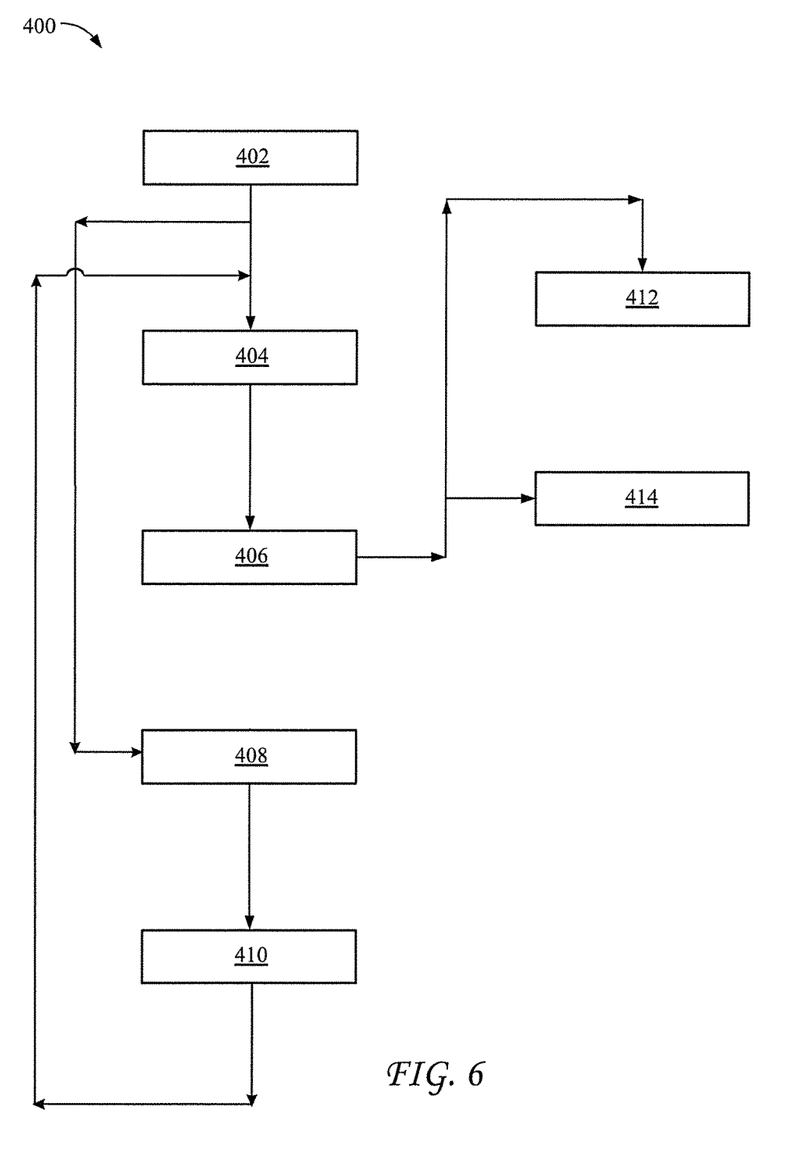
FIG. 6 illustrates a flow diagram of an exemplary method for reducing hydrate formation during the subsea transport of a multi-phase production fluid from a wellhead to a point remote from the wellhead, according to the present disclosure.

Referring now to FIG. 6, a method 400 for reducing hydrate formation during the subsea transport of a multi-phase production fluid from a wellhead to a point remote from the wellhead, according to the present disclosure, is presented. The method 400 includes, at block 402, introducing the multi-phase production fluid into a pipeline, the pipeline extending from proximate the wellhead to a point remote from the wellhead. At block 404, rotational motion (clockwise or counterclockwise) is imparted to the multi-phase production fluid; then, at block 406, the water phase is separated from the oil phase and the gas phase and the pressure drop is reduced along the pipeline. As disclosed herein, the rotational motion imparted at block 404 is effective to reduce hydrate formation.

In some embodiments, the method 400 further includes at block 408, monitoring produced water. If the produced water is below a predetermined level, additional water is injected into the pipeline at block 410.

In some embodiments, the method 400 further includes at block 412, providing one or more pumps along the length of the pipeline to periodically provide additional pressure within the pipeline to maintain flow and phase separation.

In some embodiments, the method 400 further includes at block 414, separately removing each phase of the multi-phase production fluid proximate a processing facility.

In some embodiments, the rotational motion imparted at block 404 is effective to reduce settling out of precipitated waxes and solids, including produced sand.

In some embodiments, the rotational motion imparted at block 404 is imparted by one or more helical grooves formed within a length of an internal surface of the pipeline. In some embodiments, the one or more helical grooves are continuous along substantially the entire length of the pipeline.

In some embodiments, the rotational motion imparted at block 404 is imparted by one or more helical strakes or ribs formed along a length of an internal surface of the pipeline. In some embodiments, the one or more helical strakes or ribs are continuous along substantially the entire length of the pipeline.

In some embodiments, the rotational motion imparted at block 404 is imparted by one or more water inlets tangentially positioned to the flow of the multi-phase production fluid.

EXAMPLE

To assess the benefits of the present disclosure, computational fluid dynamics, CFD, were used to evaluate the configurations described below. A CFD analysis solves fundamental controlling equations and provides information regarding fluid velocity, species, pressure, heat transfer, temperature values, etc. at every point in the solution domain. FLUENT™ software from Fluent Inc. was used to perform the analysis. (Fluent, Inc., USA, 10 Cavendish Court, Centerra Resource Park, Lebanon, N.H., 03766-1442).

Figure 7:
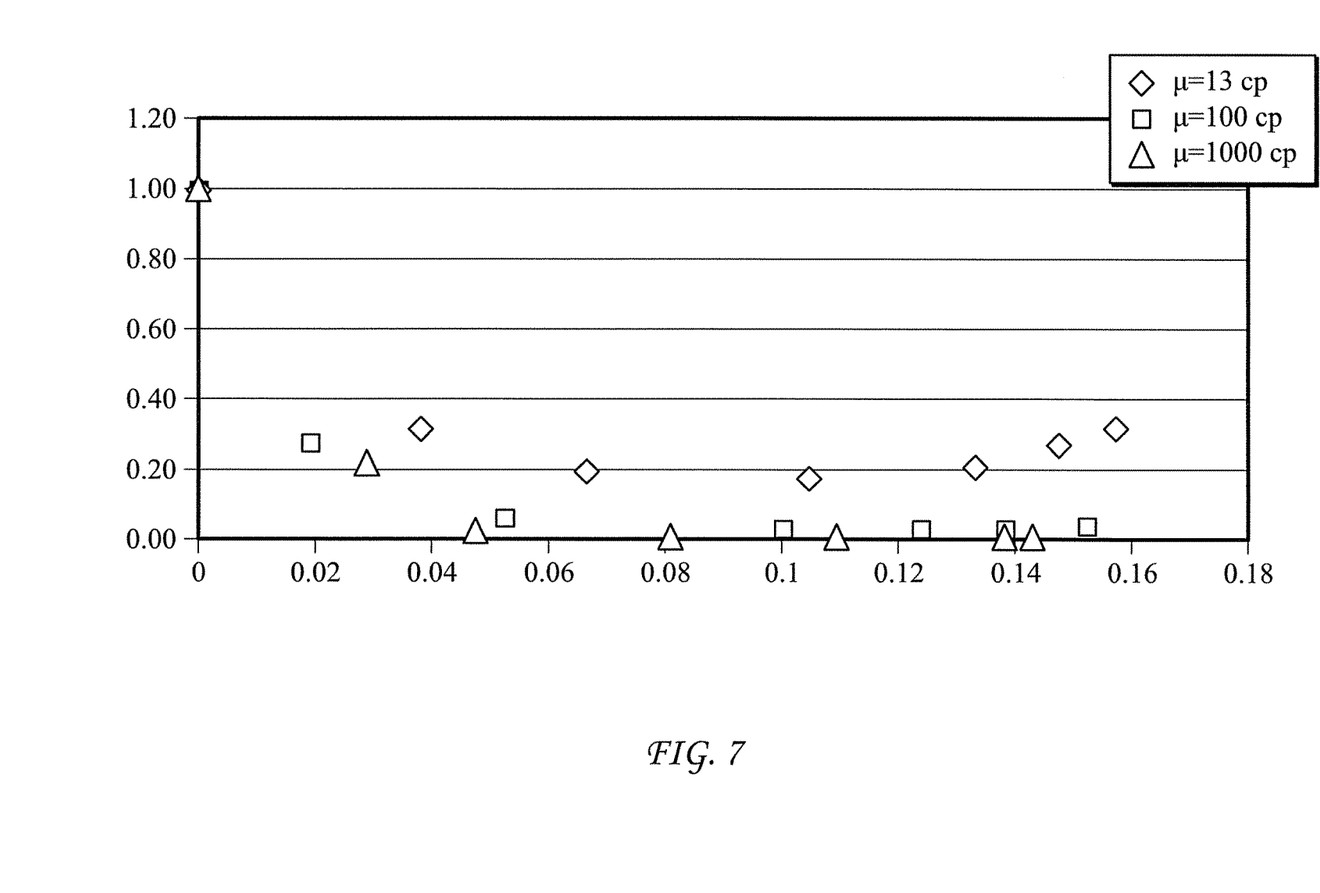
FIG. 7 shows a plot of pressure drop (CAP)/unit length, as a function of lubricating water layer thickness normalized for overall pipe diameter, derived using computation fluid dynamics (CFD).

Referring now to FIG. 7, a graph produced using a CFD model to determine the reduction in pressure drop, CAP over a unit length of pipe (vertical-axis) for various ratios of the lubrication water layer thickness to overall pipe diameter (horizontal-axis). The model was run for a two phase flow of water and immiscible fluids of varying viscosity, from a very low viscosity fluid, 13 cP (centipoise), to a relatively viscous fluid, 1,000 cP.

As can be seen, large reductions in pressure drop are achieved for even the 13 cP viscosity fluid, when the thickness of the water layer is only 6% of the pipe diameter. Thus, in contrast to the conventional use of CAF for the transfer of viscous fluids, the systems and methods disclosed herein can enhance subsea pipeline transfer of even lower-viscosity, conventional crude oils, since the CAF provides a reduction in pressure drop and the resulting pressure savings can provide the energy to rotate the fluids in the pipeline.

Thus, the benefits of the systems and methods disclosed herein, with respect to subsea production, may include: 1) potential reduction, or even elimination of, topside separation equipment; 2) potential reduction, or even elimination of, wellhead separation equipment (with the possible exception of sand separation); 3) rapid separation of produced gas into the inner core, produced oil into a secondary core, and produced water into the annulus adjacent the internal surface of the pipeline, before the flow stream cools, will keep the gas from contacting the water, reducing the formation of gas hydrates; 4) the speed of the fluid rotation may reduce or prevent solids from settling in the pipe, reducing the formation of flow obstructions, (although, it may be necessary to add a sand-catcher/separator to the pipeline); and 5) the centrifugal force will keep precipitated waxes from settling out as they will be less dense than the water, which will keep them suspended in the oil, or at the interface between the oil and the water.

INDUSTRIAL APPLICABILITY

The systems and methods disclosed herein are applicable to the oil and gas industry.

It is believed that the disclosure set forth herein encompasses multiple distinct inventions with independent utility. The specific embodiments disclosed and illustrated herein are not to be considered in a limiting sense as numerous variations are possible.

Illustrative, non-exclusive example of systems and methods according to the present disclosure have been presented. While the present disclosure may be susceptible to various modifications and alternative forms, the exemplary embodiments discussed herein have been shown only by way of example. However, it should again be understood that the present disclosure is not intended to be limited to the particular embodiments disclosed herein. Indeed, the present disclosure includes all alternatives, modifications, and equivalents falling within the true spirit and scope of the appended claims.

What is claimed is:

1. A system for the subsea transport of a multi-phase production fluid from a wellhead to a point remote from the wellhead, the system comprising:
   a multi-phase production fluid comprising a water phase, an oil phase and a gas phase;
   a pipeline extending from proximate the wellhead to a point remote from the wellhead, the pipeline structured and arranged to impart rotational motion to the multi-phase production fluid and effective to separate the water phase from the oil phase and the gas phase and reduce the pressure drop along the pipeline, wherein the pipeline is structured and arranged to impart the rotational motion to the multi-phase production fluid; and
   a core-annular flow within the pipeline comprising a center gas phase, an annulus of the oil phase surrounding the center gas phase, and a thin annulus of the water phase surrounding the annular oil phase;
   wherein the thin annulus of the water phase is formed between the wall of the pipeline and the annulus of the oil phase within the pipeline, and wherein the thickness of the thin annulus of the water phase is at least 6% of the diameter of the pipeline.

2. The system of claim 1, wherein the rotational motion imparted reduces hydrate formation.

3. The system of claim 1, wherein the rotational motion imparted reduces settling out of precipitated waxes and solids, including produced sand.

4. The system of claim 1, further comprising a plurality of pumping stations positioned along the pipeline to provide additional pressure to maintain flow and phase separation.

5. The system of claim 1, further comprising one or more helical grooves formed along an internal surface of the pipeline to impart rotational motion to the multi-phase fluid.

6. The system of claim 5, wherein the one or more helical grooves are continuous along the length of the pipeline.

7. The system of claim 1, further comprising one or more helical strakes or ribs formed along an internal surface of the pipeline to impart rotational motion to the multi-phase fluid.

8. The system of claim 7, wherein the one or more helical strakes or ribs are continuous along the length of the pipeline.

9. The system of claim 1, further comprising a water inlet tangentially positioned to the flow of the multi-phase production fluid to impart rotational motion.

10. The system of claim 1, further comprising a separation station for separately removing each phase of the multi-phase fluid proximate a processing facility.

11. The system of claim 1, further comprising:
    a detector to monitor produced water, the produced water comprising water and dissolved gas; and
    an injector to inject water into the pipeline if the produced water is below a the amount necessary to maintain the minimum thickness of the thin annulus of the water phase.

12. The system of claim 11, wherein the additional water is injected proximate the wellhead.

13. The system of claim 11, wherein the additional water injected reduces the concentration of dissolved gas below a saturation concentration.

14. A method for the subsea transport of a multi-phase production fluid from a wellhead to a point remote from the wellhead, the multi-phase production fluid comprising a water phase, an oil phase and a gas phase, the method comprising:
- introducing the multi-phase production fluid into a pipeline, the pipeline extending from proximate the wellhead to a point remote from the wellhead; and
- imparting rotational motion to the multi-phase production fluid, wherein the rotational motion of the multi-phase production fluid separates the water phase from the oil phase and the gas phase;
- creating a core-annular flow within the pipeline comprising a center gas phase, an annulus of the oil phase surrounding the center gas phase, and a thin annulus of the water phase surrounding the annular oil phase;
- maintaining the thin annulus of the water phase, wherein the thin annulus of the water phase is formed between the wall of the pipeline and the annulus of the oil phase within the pipeline, and wherein the thickness of the thin annulus of the water phase is at least 6% of the diameter of the pipeline.

15. The method of claim 14, further comprising periodically pumping along the pipeline to provide additional pressure to maintain flow and phase separation.

16. The method of claim 14, further comprising separately removing each phase of the multi-phase fluid proximate a processing facility.

17. The method of claim 14, further comprising:
- monitoring produced water; and
- if the produced water is below a predetermined level, injecting additional water into the pipeline.

18. A method for reducing hydrate formation during the subsea transport of a multi-phase production fluid from a wellhead to a point remote from the wellhead, the method comprising:
- introducing the multi-phase production fluid into a pipeline, the pipeline extending from proximate the wellhead to a point remote from the wellhead; and
- imparting rotational motion to the multi-phase production fluid;
- wherein the rotational motion of the multi-phase production fluid separates the water phase from the oil phase and the gas phase;
- creating a core-annular flow within the pipeline comprising a center gas phase, an annulus of the oil phase surrounding the center gas phase, and a thin annulus of the water phase surrounding the annulus of the oil phase, wherein the creation of the separated annular phase flow within the pipeline reduces hydrate formation within the pipeline; and
- maintaining a thin annulus of the water phase, wherein the thin annulus of the water phase is formed between the wall of the pipeline and the annulus of the oil phase within the pipeline, and wherein the thickness of the thin annulus of the water phase is at least 6% of the diameter of the pipeline.

19. The method of claim 18, further comprising:
monitoring produced water; and
- if the produced water is below a the amount necessary to maintain the minimum thickness of the thin annulus of the water phase, injecting additional water into the pipeline.

20. The method of claim 18, further comprising periodically pumping along the pipeline to provide additional pressure to maintain flow and phase separation.

* * * * *